US012559120B2

(12) United States Patent
Suh et al.

(10) Patent No.: US 12,559,120 B2
(45) Date of Patent: Feb. 24, 2026

(54) METHOD AND APPARATUS FOR PROVIDING DRIVING DATA OF AN AUTONOMOUS VEHICLE

(71) Applicants: HYUNDAI MOTOR COMPANY, Seoul (KR); KIA CORPORATION, Seoul (KR)

(72) Inventors: Jung Seok Suh, Yongin-si (KR); Hae Seong Jeong, Busan (KR); Mi Jin Chung, Seoul (KR); Ja Yoon Goo, Anyang-si (KR); Hong Gyu Lee, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 292 days.

(21) Appl. No.: 18/114,605

(22) Filed: Feb. 27, 2023

(65) Prior Publication Data

US 2024/0140463 A1 May 2, 2024

(30) Foreign Application Priority Data

Oct. 31, 2022 (KR) ........................ 10-2022-0142960

(51) Int. Cl.
*G07C 5/00* (2006.01)
*B60K 35/28* (2024.01)
(Continued)

(52) U.S. Cl.
CPC ............. *B60W 50/14* (2013.01); *B60K 35/28* (2024.01); *B60W 60/001* (2020.02); *B60K 35/23* (2024.01);
(Continued)

(58) Field of Classification Search
CPC .............. B60W 50/14; B60W 60/001; B60W 2554/4029; B60W 2552/53;
(Continued)

(56) References Cited

U.S. PATENT DOCUMENTS

| | | | | |
|---|---|---|---|---|
| 2001/0012976 A1* | 8/2001 | Menig | .................... | B60K 35/29 |
| | | | | 701/1 |
| 2010/0253600 A1* | 10/2010 | Seder | ................ | B32B 17/10036 |
| | | | | 345/7 |
| 2012/0224060 A1* | 9/2012 | Gurevich | ............. | G01C 21/365 |
| | | | | 348/148 |
| 2015/0146004 A1* | 5/2015 | Kritt | ....................... | H04N 7/181 |
| | | | | 348/159 |

(Continued)

OTHER PUBLICATIONS

Renate Häuslschmid, Bastian Pfleging, Max von Bülow, & Andreas Butz; Supporting Trust in Autonomous Driving; Mar. 2017; Researchgate.net; Conference: Proceedings of the 22nd International Conference on Intelligent User Interfaces (IUI '17); p. 2-9 (Year: 2017).*

*Primary Examiner* — Michael V Kerrigan
*Assistant Examiner* — Anthony Gabriel Mora
(74) *Attorney, Agent, or Firm* — Lempia Summerfield Katz LLC

(57) ABSTRACT

Disclosed is a method of providing driving information of an autonomous vehicle performed by an apparatus that includes a first sensor unit, a second sensor unit, a processor, and a projection unit. The method includes: acquiring, by the first sensor unit, surroundings information of the autonomous vehicle; acquiring, by the second sensor unit, information on an occupant on board the autonomous vehicle; generating, by the processor, main driving information from the surroundings information of the autonomous vehicle acquired by the first sensor unit; determining, by the processor, the main driving information to be provided to the occupant from among the main driving information based on the information on the occupant; and providing, by the projection unit, the main driving information determined by the processor to the occupant of the autonomous vehicle.

20 Claims, 5 Drawing Sheets

*100*

(51) Int. Cl.

| | |
|---|---|
| *B60W 50/14* | (2020.01) |
| *B60W 60/00* | (2020.01) |
| *G07C 5/02* | (2006.01) |
| *G07C 5/04* | (2006.01) |
| *G07C 5/08* | (2006.01) |
| *B60K 35/23* | (2024.01) |

(52) U.S. Cl.
CPC .. *B60K 2360/175* (2024.01); *B60W 2050/146* (2013.01); *B60W 2540/21* (2020.02); *B60W 2552/53* (2020.02); *B60W 2554/4029* (2020.02); *B60W 2555/60* (2020.02)

(58) Field of Classification Search
CPC ........ B60W 2540/21; B60W 2555/60; B60W 2050/146; B60K 35/00; B60K 35/28; B60K 35/23; B60K 2360/175
See application file for complete search history.

(56) References Cited

U.S. PATENT DOCUMENTS

| | | | |
|---|---|---|---|
| 2016/0311323 A1* | 10/2016 | Lee | B60K 35/10 |
| 2016/0375768 A1* | 12/2016 | Konet | B60K 35/22 |
| | | | 348/148 |
| 2017/0364148 A1* | 12/2017 | Kim | G06F 3/1462 |
| 2019/0383631 A1* | 12/2019 | Bigio | G06V 20/59 |
| 2020/0082590 A1* | 3/2020 | Woo | G06V 40/28 |
| 2020/0290606 A1* | 9/2020 | Watanabe | G08G 1/166 |
| 2020/0410264 A1* | 12/2020 | Ahn | B60K 35/265 |
| 2021/0023946 A1* | 1/2021 | Johnson | B60K 35/00 |
| 2021/0031625 A1* | 2/2021 | Choi | B60K 35/10 |
| 2021/0110552 A1* | 4/2021 | Bhat | G06T 7/70 |
| 2021/0291653 A1* | 9/2021 | Higashiyama | B60K 35/22 |
| 2021/0362598 A1* | 11/2021 | Oh | G06Q 30/02 |
| 2022/0041133 A1* | 2/2022 | Rrumbullaku | H04W 4/02 |
| 2022/0307855 A1* | 9/2022 | Deng | G02B 27/0101 |

* cited by examiner

<u>*100*</u>

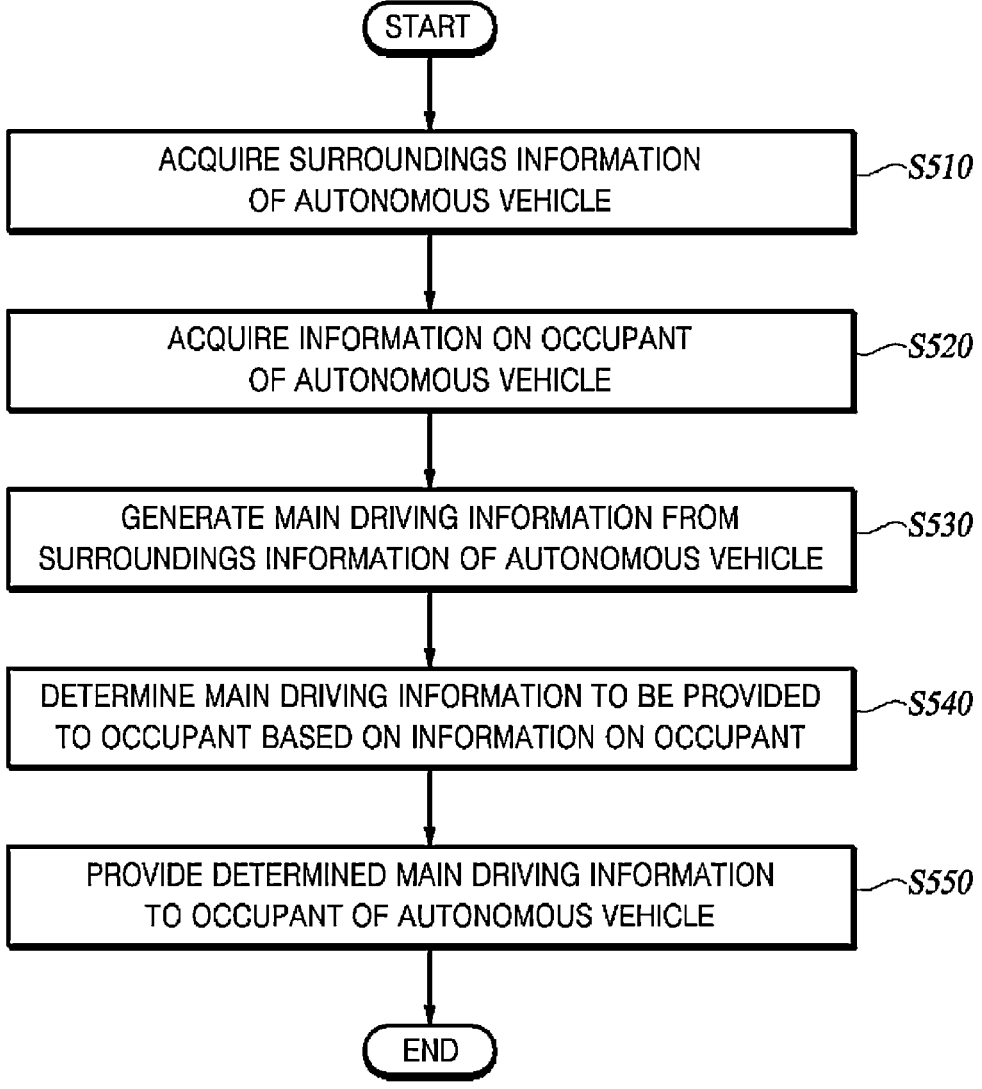

START

ACQUIRE SURROUNDINGS INFORMATION
OF AUTONOMOUS VEHICLE ⟶ *S510*

ACQUIRE INFORMATION ON OCCUPANT
OF AUTONOMOUS VEHICLE ⟶ *S520*

GENERATE MAIN DRIVING INFORMATION FROM
SURROUNDINGS INFORMATION OF AUTONOMOUS VEHICLE ⟶ *S530*

DETERMINE MAIN DRIVING INFORMATION TO BE PROVIDED
TO OCCUPANT BASED ON INFORMATION ON OCCUPANT ⟶ *S540*

PROVIDE DETERMINED MAIN DRIVING INFORMATION
TO OCCUPANT OF AUTONOMOUS VEHICLE ⟶ *S550*

END

*FIG. 5*

METHOD AND APPARATUS FOR PROVIDING DRIVING DATA OF AN AUTONOMOUS VEHICLE

CROSS-REFERENCE TO RELATED APPLICATION

This application claims the benefit of and priority to Korean Patent Application No. 10-2022-0142960, filed on Oct. 31, 2022, the entire contents of which are incorporated herein by reference.

TECHNICAL FIELD

The present disclosure relates to a method and apparatus for providing driving information to an occupant in an autonomous vehicle.

BACKGROUND

The statements in this section merely provide background information related to the present disclosure and do not necessarily constitute prior art.

In recent years, with the fusion of information and communication technology and automotive electronics technology, a technology for intelligent vehicles, particularly, autonomous vehicles that autonomously drive to a destination without an operation of a driver is being actively developed.

The autonomous vehicle, without a separate operation of a driver, recognizes vehicles, pedestrians, obstacles, or the like present on a road by using sensors such as radars, LiDARs, and cameras mounted on the vehicle, determines a driving situation, and drives itself to a destination while performing distance maintenance, lane maintenance, lane change, or the like depending on the situation. However, since the autonomous vehicle drives while determining the driving situation without human intervention or with minimal human intervention, an occupant may wonder whether the autonomous vehicle is accurately recognizing and determining the driving situation around the vehicle and driving, or the occupant may feel anxious about reliability of an autonomous driving system.

In response to this demand, recently, various human machine interface user experience (HMI UX) technologies that enable interaction between an autonomous vehicle and an occupant and can provide various types of driving information to the occupant are being developed. However, the related art simply guides the gaze of the occupant to a preset specific driving situation or an object outside the autonomous vehicle, and there is a problem that this is insufficient for the occupant to have trust that the autonomous vehicle is accurately recognizing a surrounding driving situation while driving.

SUMMARY

A method and apparatus for providing driving information according to an embodiment may generate main driving information based on surroundings information of an autonomous vehicle and determine main driving information that is to be provided to an occupant based on information on the occupant.

The method and apparatus for providing driving information according to an embodiment may provide main driving information to an occupant by projecting the main driving information on an inner surface of a windshield glass inside a vehicle.

The aspects of the present disclosure are not limited to the foregoing, and other aspects not mentioned herein should be clearly understood by those having ordinary skill in the art from the following description.

According to an embodiment of the present disclosure, a method for providing driving information for an autonomous vehicle performed by an apparatus is provided. The apparatus for providing driving information for the autonomous vehicle includes a first sensor unit, a second sensor unit, a processor, and a projection unit. The method includes: acquiring, by the first sensor unit, surroundings information of the autonomous vehicle; acquiring, by the second sensor unit, information on an occupant boarding the autonomous vehicle; generating, by the processor, main driving information from the surroundings information of the autonomous vehicle acquired by the first sensor unit; determining, by the processor, the main driving information to be provided to the occupant from among the main driving information based on the information on the occupant; and providing, by the projection unit, the main driving information determined by the processor to the occupant of the autonomous vehicle.

In an aspect, the information on the occupant includes at least one of information on a line-of-sight direction in which the occupant gazes, information on a behavior of the occupant, or voice information on utterance of the occupant.

In an aspect, wherein generating the main driving information from the surroundings information of the autonomous vehicle acquired by the first sensor unit includes determining a driving state of the autonomous vehicle, setting at least one monitoring target set in advance according to the driving state, and detecting the monitoring target from the surroundings information of the autonomous vehicle acquired by the first sensor unit.

In an aspect, the at least one monitoring target set in advance comprises at least one of another vehicle present around the autonomous vehicle, a pedestrian present around the autonomous vehicle, an obstacle on a driving route of the autonomous vehicle, a traffic light present in front of the autonomous vehicle, a road surface sign present in front of the autonomous vehicle, or a road traffic sign present in front of the autonomous vehicle.

In an aspect, determining the main driving information to be provided to the occupant from among the main driving information based on the information on the occupant includes determining a region of interest of the occupant based on the information on the occupant, and determining main driving information corresponding to the region of interest of the occupant from among the main driving information.

In an aspect, providing the main driving information determined by the processor to the occupant of the autonomous vehicle includes determining a point to project the main driving information onto from among a plurality of preset points inside the autonomous vehicle based on the information on the occupant, and projecting, by the projection unit located inside the autonomous vehicle, an image regarding the main driving information onto the point.

In an aspect, the point onto which the main driving information is projected comprises a point on an inner surface of one of at least one windshield glasses of the autonomous vehicle.

According to another embodiment of the present disclosure, an apparatus for providing driving information for an autonomous vehicle includes: a first sensor unit configured to acquire surroundings information of the autonomous vehicle; a second sensor unit configured to acquire information on an occupant on board the autonomous vehicle; a processor configured to generate main driving information from the surroundings information of the autonomous vehicle acquired by the first sensor unit, and determine main driving information to be provided to the occupant from among the main driving information based on the information on the occupant acquired by the second sensor unit; and a projection unit configured to provide the main driving information determined by the processor to the occupant.

In an aspect, wherein the information on the occupant includes at least one of information on a line-of-sight direction in which the occupant gazes, information on a behavior of the occupant, or voice information on utterance of the occupant.

In an aspect, the processor is configured to: determine a driving state of the autonomous vehicle, set at least one monitoring target set in advance according to the driving state, and detect the monitoring target from the surroundings information of the autonomous vehicle acquired by the first sensor unit.

In an aspect, the at least one monitoring target set in advance comprises at least one of another vehicle present around the autonomous vehicle, a pedestrian present around the autonomous vehicle, an obstacle on a driving route of the autonomous vehicle, a traffic light present in front of the autonomous vehicle, a road surface sign present in front of the autonomous vehicle, or a road traffic sign present in front of the autonomous vehicle.

In an aspect, the processor is configured to determine a region of interest of the occupant based on the information on the occupant, and determine main driving information corresponding to the region of interest of the occupant from among the main driving information.

In an aspect, the projection unit or the processor is configured to determine a point to project the main driving information onto from among a plurality of preset points inside the autonomous vehicle based on the information on the occupant, and the projection unit is configured to project an image regarding the main driving information onto the point.

In an aspect, the point onto which the main driving information is projected comprises a point on an inner surface of one of at least one windshield glasses of the autonomous vehicle.

According to the embodiments, the method and apparatus for providing driving information generates a main driving information based on surroundings information of the autonomous vehicle and determines the main driving information to be provided to the occupant based on information on the occupant, thereby providing main driving information with which the occupant can check whether autonomous driving of the vehicle is being performed accurately and smoothly.

According to embodiments, the method and apparatus for providing driving information provides the main driving information to the occupant by projecting the main driving information onto an inner surface of a windshield glass inside the vehicle, allowing the occupant to immediately check the main driving information and have trust in an autonomous system.

BRIEF DESCRIPTION OF THE DRAWINGS

The above and other objects, features and advantages of the present disclosure may be more apparent from the following detailed description taken in conjunction with the accompanying drawings, in which:

FIG. 5 is a flowchart illustrating a method for providing driving information according to an embodiment of the present disclosure.

DETAILED DESCRIPTION

Figure 1:
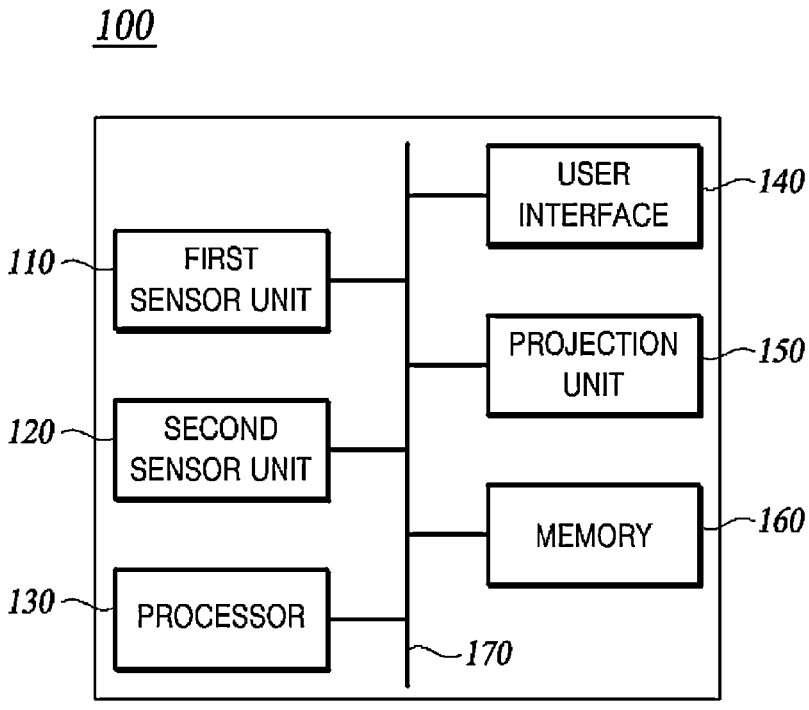
FIG. 1 is a block diagram of an apparatus for providing driving information, according to an embodiment of the present disclosure.

Hereinafter, embodiments of the present disclosure are described in detail with reference to the accompanying drawings. In the following description, like reference numerals designate like elements, although the elements are shown in different drawings. Furthermore, in the following description, a detailed description of known functions and configurations incorporated therein is omitted for the purpose of clarity and for brevity.

Additionally, various terms such as first, second, A, B, etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary.

Each element of the apparatus or method according to embodiments of the present disclosure may be implemented in hardware or software, or a combination of hardware and software. The functions of the respective elements may be implemented in software, and a microprocessor may be configured to execute the software functions corresponding to the respective elements.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram of an apparatus for providing driving information, according to an embodiment of the present disclosure.

Referring to FIG. 1, an apparatus for providing driving information 100, according to an embodiment, includes a first sensor unit 110, a second sensor unit 120, a processor 130, a user interface 140, a projection unit 150, and a memory 160. The first sensor unit 110, the second sensor unit 120, the processor 130, the user interface 140, the projection unit 150, and the memory 160 included in the apparatus for providing driving information 100 may be configured to transmit data to each other via a bus 170.

The first sensor unit 110 may sense surroundings of the autonomous vehicle to acquire surroundings information. The first sensor unit 110 may be installed at at least one preset position on the autonomous vehicle to sense the surroundings of the autonomous vehicle and acquire surroundings information used for driving of the autonomous vehicle.

The first sensor unit 110 may include at least one sensor configured to sense the surroundings of the autonomous vehicle. In an embodiment, the sensor may include at least one of a camera module, an ultrasonic sensor, a radar, or a LiDAR.

The first sensor unit 110 may be configured to acquire surroundings information by using a plurality of sensors of different types for the forward, backward, and side directions of the autonomous vehicle. For example, the first sensor unit 110 may be configured to acquire the surroundings information based on an image obtained by a camera module photographing the surroundings of the autonomous vehicle in real time, and distance and speed information of an object around the autonomous vehicle sensed by a radar or LiDAR.

The first sensor unit 110 may be configured to acquire different surroundings information set according to a driving scenario of the autonomous vehicle. For example, the first sensor unit 110 may be set to acquire surroundings information corresponding to different driving scenarios, such as a case in which the autonomous vehicle passes through an intersection, a case in which the autonomous vehicle changes a driving lane to an adjacent lane, or a case in which the autonomous vehicle passes through a pedestrian crosswalk.

The second sensor unit 120 may be configured to sense an occupant onboard the autonomous vehicle and acquire information on the occupant. The second sensor unit 120 may be installed at at least one preset point inside the vehicle to sense the occupant. The second sensor unit 120 may include one or more camera units, infrared sensors, microphones, or the like.

The second sensor unit 120 may be configured to sense whether there is an occupant in the autonomous vehicle. For example, when an occupant is sensed by an infrared sensor installed to sense a seat area inside the autonomous vehicle, or when an object corresponding to a person is detected in an internal image of the autonomous vehicle captured by a camera unit, the apparatus for providing driving information 100 may determine that there is an occupant in the autonomous vehicle.

The second sensor unit 120 may be configured to acquire the information on the occupant of the autonomous vehicle. In an embodiment, the information on the occupant of the autonomous vehicle may include at least one of information on a line-of-sight direction in which the occupant gazes, information on a behavior of the occupant, or voice information on utterance of the occupant.

In an embodiment, the second sensor unit 120 may be configured to acquire information on a situation of the occupant in order to determine whether the occupant requests driving information of the autonomous vehicle. For example, the occupant may want to know a traffic situation of surroundings of the autonomous vehicle or driving information regarding what surrounding object the autonomous vehicle is currently recognizing and tracking while driving, in order to check whether driving of the autonomous vehicle is accurately performed. The second sensor unit 120 may acquire information on the occupant from which the intention of the occupant who wants to check real-time driving information of the autonomous vehicle can be inferred.

In an embodiment, the second sensor unit 120 may acquire the information on the line-of-sight direction in which the occupant is looking based on a pupil position of the occupant of the autonomous vehicle. When the line-of-sight direction of the occupant is directed to a direction in which the vehicle is traveling, which may be a direction set in advance with respect to the outside of the vehicle, or a surrounding direction, the apparatus for providing driving information 100 may determine that the occupant requests information on a forward driving situation outside the autonomous vehicle.

According to another embodiment of the present disclosure, when the second sensor unit 120 senses, in addition to the line-of-sight direction of the occupant, a voice signal regarding a command requesting the driving information of the autonomous vehicle among voice signals for utterance of the occupant, the apparatus for providing driving information 100 may determine that the occupant requests information on the driving situation outside the autonomous vehicle. However, the present disclosure is not limited thereto, and, in some embodiments, the apparatus for providing driving information 100 may determine that the occupant requests the information on the driving situation outside the autonomous vehicle in other suitable manners. For example, even when the second sensor unit 120 senses a preset behavior of the occupant, the apparatus for providing driving information 100 may determine that the occupant requests the information on the driving situation outside the autonomous vehicle.

The surroundings information of the autonomous vehicle acquired by the first sensor unit 110 and the information on the occupant acquired by the second sensor unit 120 may be transmitted to the processor 130.

The processor 130 may be configured to generate main driving information based on the surroundings information of the autonomous vehicle acquired by the first sensor unit 110 and determine the main driving information that is to be provided to the occupant based on the information on the occupant acquired by the second sensor unit 120.

The main driving information may be information selected in advance as a monitoring target of the autonomous vehicle according to closeness to the driving situation among information on the surroundings situation of the autonomous vehicle. For example, the processor 130 may determine information to be considered for driving control of the autonomous vehicle, such as information on other vehicles or pedestrians around the autonomous vehicle, obstacles present on a driving route of the autonomous vehicle, traffic lights present in front of the autonomous vehicle, and road surface signs and road traffic signs present on a route of the autonomous vehicle in front of the autonomous vehicle as the main driving information.

The main driving information may include a first main driving information and a second main driving information classified according to a preset priority. In an embodiment, the preset priority may be determined according to a difference in a degree of influence on safety from among information that should be considered at the time of driving control of the autonomous vehicle. For example, the processor 130 may set one or more surrounding objects to be tracked for collision prevention in various driving situations of the autonomous vehicle as a first monitoring target, set information on such objects as the first main driving information, set other surrounding objects that should be considered preparatorily and incidentally as second monitoring targets, and determine information on such objects as the second main driving information.

In an embodiment, the main driving information may include first main driving information and second main driving information including different surroundings information according to a plurality of preset driving scenarios.

For example, main driving information for a scenario in which the autonomous vehicle joins a road located in front of the autonomous vehicle may include the first main driving information including information on lanes on the road located in front of the autonomous vehicle, information on other vehicles located on the road located in front of the autonomous vehicle, and information on another vehicle located on the rear side in a merging process, and the second main driving information that is information on other vehicles on the rear side.

Main driving information for a scenario in which the autonomous vehicle passes through an intersection may include the first main driving information including signal information on a front traffic light, position information of a stop line, information on other vehicles in front of the autonomous vehicle, and information on pedestrians in front of the autonomous vehicle, and second main driving information including information on other vehicles on the rear side and information on other vehicles driven in an opposite lane.

Main driving information for a scenario in which the autonomous vehicle attempts to change a lane to an adjacent lane may include the first main driving information including information on other vehicles present in front of the autonomous vehicle on a current lane and information on other vehicles traveling in adjacent lanes present at a side front side and a side rear side, and second main driving information including information on other vehicles present to the rear side on the current lane. Various driving scenarios of the autonomous vehicle may be set in addition to the above-described examples, and different main driving information may be set for each scenario.

The processor 130 may be configured to generate the main driving information based on the surroundings information. For example, the processor 130 may detect an object corresponding to at least one monitoring target preset according to the driving state on an image obtained by photographing the surroundings of the autonomous vehicle, and generate the main driving information including position information of the object.

The processor 130 may be configured to determine, based on the occupant information acquired by the second sensor unit 120, the information to be provided to the occupant from among the main driving information. For example, the processor 130 may determine a region of interest of the occupant based on the information on the occupant, and determine the main driving information corresponding to the region of interest of the occupant from among the generated main driving information as the information to be provided to the occupant. In an example, the region of interest of the occupant may be a region corresponding to a specific direction to which a driving situation that the occupant wonders or wants to check corresponds.

The information to be provided to the occupant may be determined based on information on the line-of-sight direction of the occupant included in the information on the occupant acquired by the second sensor unit 120. For example, when the line-of-sight direction of the occupant included in the information on the occupant acquired by the second sensor unit 120 is a forward direction of the autonomous vehicle, the processor 130 may determine the forward direction of the autonomous vehicle as the region of interest of the occupant, and determine the main driving information regarding the forward direction of the autonomous vehicle from among a plurality of pieces of main driving information as the information to be provided to the occupant.

According to another embodiment, the processor 130 may detect any one or more objects around the autonomous vehicle at which the occupant gazes based on the information on the line-of-sight direction of the occupant, and determine main driving information on the objects as the information to be provided to the occupant.

The user interface 140 may be configured to interact with the occupant of the autonomous vehicle, provide information to the user, and receive information on request matters from the occupant.

The user interface 140 may include an image implemented as a virtual driver of the autonomous vehicle including a face shape. In various embodiments, the virtual driver may be implemented as a two-dimensional image or a three-dimensional holographic image including a face shape obtained by visually implementing the virtual driver of the autonomous vehicle. An image of the virtual driver may be displayed with a changed line-of-sight direction or various facial expressions according to the driving situation. Accordingly, a virtual driver of the user interface 140 may provide information through interaction with the occupant to provide the occupant with the same experience as that provided by a driver who is actually driving the vehicle, so that the occupant can trust safe vehicle control and driving operation of the autonomous vehicle.

For example, the virtual driver of the user interface 140 may be displayed to monitor the occupant when the occupant boards, and may receive request matters from the occupant, such as destination information. During the driving of the autonomous vehicle, the virtual driver may be displayed to monitor a direction of an object that is being tracked in real time for control of the autonomous vehicle, such as a preceding vehicle or pedestrian, as if the driver of the vehicle focuses on driving while monitoring the forward side.

In some embodiments, the user interface 140 may be configured to provide various types of information or perform a control operation through interaction with the occupant. When an additional request from the occupant or a preset operation is sensed, for example, when the occupant wants to change an internal temperature of the autonomous vehicle, the virtual driver of the user interface 140 may be displayed to receive a command while monitoring the occupant again or may provide navigation information on a current moving route, real-time news information, and the like according to a request from the occupant. In an embodiment, the face image of the virtual driver displayed on the user interface 140 may represent various facial expressions for smooth interaction with the occupant, and additionally, output a voice or receive an uttered voice of the occupant.

The projection unit 150 may project at least one image regarding the information to be provided to the occupant determined by the processor 130 based on the occupant information acquired by the second sensor unit 120.

When the projection unit 150 receives data from the processor 130 regarding the information to be provided to the occupant, the projection unit 150 may project an image corresponding to the information to be provided to the occupant onto a preset internal surface of the windshield glass. In an embodiment, the projection unit 150 may include a plurality of image projection modules installed for each of a plurality of windshield glasses of the autonomous vehicle. For example, the projection unit 150 may include a front image projection module for projecting the information to be provided to the occupant onto the internal surface of the front windshield glass when the information to be provided to the occupant is located in front of the autonomous vehicle, left and right image projection modules for projecting the information to be provided to the occupant onto an inner surface of a left or right windshield glass when the information to be provided to the occupant is located on the left or right side of the autonomous vehicle, and a rear image projection module for projecting the information to be provided to the occupant onto an internal surface of a rear windshield glass when the information to be provided to the occupant is located behind the autonomous vehicle.

In an embodiment, when the line-of-sight direction of the occupant included in the information on the occupant acquired by the second sensor unit 120 corresponds to the forward direction of the autonomous vehicle, the processor 130 may determine the main driving information regarding the forward direction of the autonomous vehicle from among the plurality of pieces of main driving information as the information to be provided to the occupant, and transmit the data regarding the information to be provided to the occupant to the front image projection module. The front image projection module may project a preset image corresponding to the received information onto the internal surface of the front windshield glass. In an embodiment, the data regarding the information to be provided to the occupant may include position information of a gaze point determined based on the information on the line-of-sight direction of the occupant and position information on at least one object included in the main driving information.

The projection unit 150 may project a preset image onto a position on the inner surface of the windshield glass determined by considering a position of at least one object included in the information on the line-of-sight direction of the occupant and the main driving information so that the occupant can easily check the information to be provided to the occupant. In an embodiment, the preset image may be projected as a highlight image that is displayed around the object. The occupant can immediately check the object that the autonomous vehicle is monitoring from the highlight image projected in the line-of-sight direction of the occupant.

The projection unit 150 may be implemented as a headup display (HUD) configured to project an augmented image onto the inner surface of the windshield glass, but the present disclosure is not limited thereto, and, in some embodiments, the projection unit 150 may be configured to project in real time, onto the inner surface of the windshield glass in the direction in which the image is to be projected, an entire image of the corresponding direction including the highlight image.

The memory 160 may include a volatile memory, a permanent memory, a virtual memory, or another type of memory for storing information that is used or output by the apparatus for providing driving information 100. For example, the memory 160 may include a random access memory (RAM) or a dynamic RAM (DRAM).

The memory 160 may store a program for processing or control of the processor 130, and various types of data for an operation of the apparatus for providing driving information 100. For example, at least one or more of the main driving information selected in advance according to the closeness with the driving situation among the information on the surroundings information of the autonomous vehicle, the information on the occupants, or the information on the surroundings situation of the autonomous vehicle provided to the processor 130 may be stored in the memory 160. Information on a priority for determining the first main driving information and the second main driving information among the main driving information, and setting information, such as a criterion for determining the line-of-sight direction of the occupant and a criterion for determining a behavior of the occupant, may be stored in the memory 160.

Figure 2A:
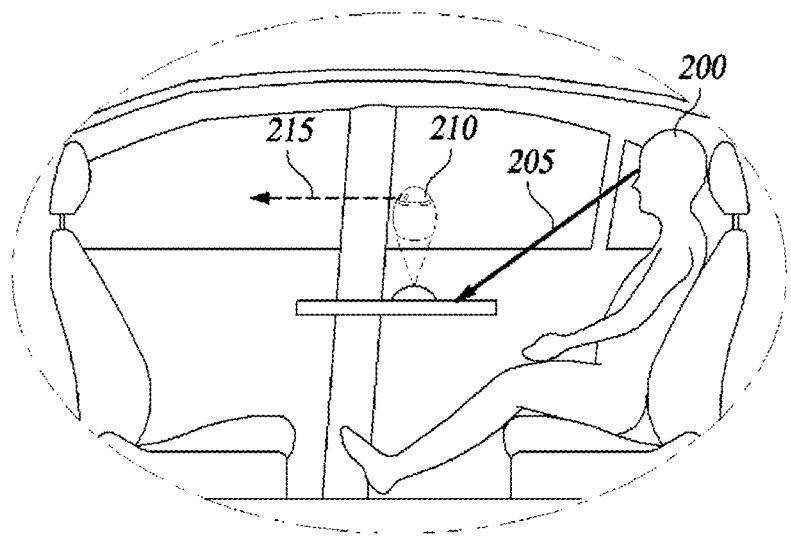
FIGS. 2A and 2B are diagrams illustrating a process in which the apparatus for providing driving information provides driving information to an occupant, according to embodiments of the present disclosure.
Figure 2B:
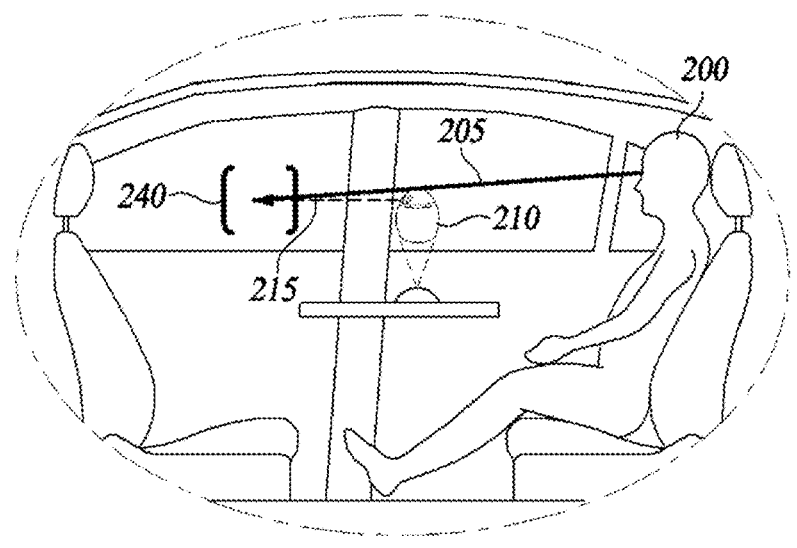

FIGS. 2A and 2B are diagrams illustrating a process in which the apparatus for providing driving information provides the driving information to the occupant, according to embodiments of the present disclosure.

FIG. 2A illustrates an operation of the apparatus for providing driving information when the occupant does not request the information on the driving situation outside the autonomous vehicle.

In the embodiment of FIG. 2A, a line-of-sight direction 205 of an occupant 200 is directed to the inside of the vehicle. Since the occupant 200 may be talking with another occupant inside the autonomous vehicle, using information provided by a user interface 210, or performing various other actions, the occupant 200 may not be interested in a driving situation outside the autonomous vehicle. The apparatus for providing driving information may sense that the line-of-sight direction 205 of the occupant 200 is not a preset line-of-sight direction, e.g., a line-of-sight direction set in advance as a situation in which the occupant wants to know the driving situation outside the autonomous vehicle, and the apparatus may determine that there is no request from the occupant for provision of the main driving information.

The apparatus for providing driving information may include the user interface 210 installed inside the autonomous vehicle. According to an embodiment, the user interface 210 is implemented as a virtual driver face image generated as a three-dimensional holographic image.

The three-dimensional hologram image of the virtual driver face of the user interface 210 may be reproduced as an image showing gazing at a monitoring target included in the main driving information as indicated by an arrow 215 while the autonomous vehicle is driving. For example, the virtual driver face generated as the three-dimensional holographic image may be expressed as an image shown to be gazing at the front or surroundings as indicated by the arrow 215, as if the real driver concentrates on driving while monitoring ahead.

In the apparatus of FIG. 2B, the line-of-sight direction 205 of the occupant 200 is directed to a position of the main driving information outside the vehicle. The apparatus for providing driving information may sense that the line-of-sight direction 205 of the occupant 200 corresponds to a line-of-sight direction set in advance as a situation in which the occupant 200 wants to know the driving situation outside the autonomous vehicle, and determine that there is a request from the occupant for provision of the main driving information.

When the apparatus for providing driving information senses that the line-of-sight direction 205 of the occupant 200 matches a direction of the monitoring target included in the main driving information at which the user interface 210 is gazing as indicated by the arrow 215, the apparatus for providing driving information may project a highlight image 240 onto the surroundings of the monitoring target and provide the main driving information to the occupant 200. Based on the highlight image 240, the occupant 200 may check main driving information regarding a target that the autonomous vehicle is monitoring while driving in the situation outside the autonomous vehicle.

Figure 3A:
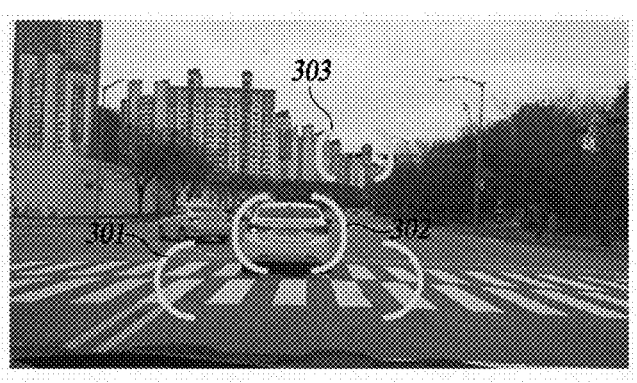
FIGS. 3A-3C are diagrams illustrating the driving information provided to the occupant by the apparatus for providing driving information, according to embodiments of the present disclosure.
Figure 3B:
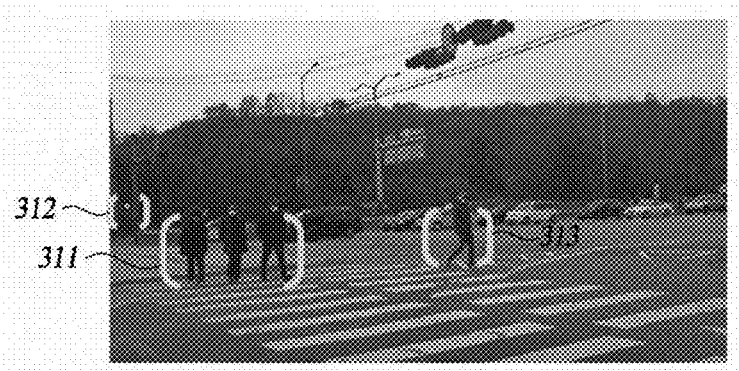
Figure 3C:
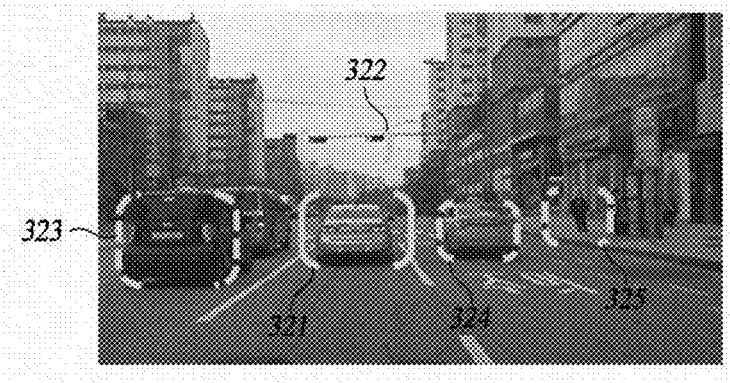

FIGS. 3A-3C are diagrams illustrating driving information provided to the occupant by the apparatus for providing driving information, according to embodiments of the present disclosure.

FIG. 3A illustrates an image projected onto the front windshield glass of the autonomous vehicle by the apparatus for providing driving information when the occupant gazes at the forward direction inside the autonomous vehicle that is turning left at an intersection.

Referring to FIG. 3A, since the autonomous vehicle is turning left at the intersection, the autonomous vehicle should drive while considering information on other vehicles preceding in front of the autonomous vehicle, information on a stop line or a crosswalk present at the intersection, a front traffic light signal information for checking the presence or absence of a left turn signal, and the like.

Accordingly, monitoring target objects included in main driving information on the forward side of the autonomous vehicle may be determined to be a crosswalk 301, a preceding vehicle 302, and a traffic light 303 according to a preset scenario in which the autonomous vehicle makes a left turn at an intersection. The autonomous vehicle may detect and track the crosswalk 301, the preceding vehicle 302, and the traffic light 303 based on the surroundings information acquired by the first sensor unit of the apparatus for providing driving information.

When it is sensed that the occupant is gazing at the main driving information on the forward side of the vehicle based on the information on the line-of-sight direction of the occupant acquired by the second sensor unit of the apparatus for providing driving information, the apparatus for providing driving information projects a highlight image onto respective positions corresponding to the crosswalk 301, the preceding vehicle 302, and the traffic light 303 on the inner surface of the front windshield glass with reference to a field of view of the occupant.

FIG. 3B shows an image projected onto a left windshield glass of the autonomous vehicle by the apparatus for providing driving information when the occupant gazes at the left side inside the autonomous vehicle stopped in front of the crosswalk.

Referring to FIG. 3B, since the autonomous vehicle stops in front of a crosswalk according to a pedestrian crossing signal at an intersection, information on crossing pedestrians, information on a stop line or a crosswalk present at the intersection, signal information of a pedestrian traffic light for checking the end of the pedestrian crossing signal, and the like should be considered.

Monitoring target objects included in the main driving information on the left side of the autonomous vehicle may be determined to be pedestrians 311 crossing in a crosswalk area, a pedestrian 312 crossing out of the crosswalk area, and a pedestrian traffic light 313 according to a preset scenario in which the autonomous vehicle stops in front of the crosswalk. The autonomous vehicle stopped in front of the crosswalk may detect and track the pedestrians 311 crossing in the crosswalk area, the pedestrian 312 crossing out of the crosswalk area, and the pedestrian traffic light 313 based on the surroundings information acquired by the first sensor unit of the apparatus for providing driving information.

When it is sensed that the occupant is gazing at the main driving information on the left side of the vehicle based on the information on the line-of-sight direction of the occupant acquired by the second sensor unit of the apparatus for providing driving information, the apparatus for providing driving information may project highlight images onto positions corresponding to the pedestrians 311 crossing in the crosswalk area, the pedestrian 312 crossing out of the crosswalk area, and the pedestrian traffic light 313 on the inner surface of the left windshield glass with reference to the field of view of the occupant.

FIG. 3C illustrates an image projected on the front windshield glass of the autonomous vehicle by the apparatus for providing driving information when the occupant gazes at a forward direction inside the autonomous vehicle waiting for a signal.

Referring to FIG. 3C, since the autonomous vehicle stops according to a stop signal of a traffic light, the autonomous vehicle may first consider information on other vehicles stopped in front of the autonomous vehicle and signal information of a front traffic light for checking whether the stop signal ends.

According to yet another embodiment, in order to prepare for change in driving situation after the stop signal ends, the autonomous vehicle may additionally consider other vehicles stopped on front left and right adjacent lanes or positions of pedestrians around the autonomous vehicle, in addition to the other vehicles stopped on the same lane in front of the autonomous vehicle.

According to a preset scenario in which the autonomous vehicle stops according to a stop signal, the main driving information of the autonomous vehicle may be divided into the first main driving information that should be considered first and the second main driving information that should be considered preparatorily and incidentally and set. In an apparatus, the monitoring target object included in the first main driving information may be determined to be another vehicle 321 stopped on the same lane in front of the autonomous vehicle and a front traffic light 322, and the monitoring target object included in the second main driving information may be determined as other vehicles 323 and 324 stopped on the front left and right adjacent lanes and a pedestrian 325 present on a front sidewalk area. The autonomous vehicle stopped according to a stop signal of a vehicle traffic light may detect and track the other vehicle 321 stopped on the same lane in front of the autonomous vehicle, the front traffic light 322, the other vehicles 323 and 324 stopped on the front left and right adjacent lanes, and the pedestrian 325 present on the front sidewalk area based on the surroundings information acquired by the first sensor unit of the apparatus for providing driving information.

When it is sensed that the occupant is gazing at the main driving information on the forward side of the vehicle based on the information on the line-of-sight direction of the occupant acquired by the second sensor unit of the apparatus for providing driving information, the apparatus for providing driving information may project a highlight image onto respective positions corresponding to the objects determined by the main driving information on the inner surface of the front windshield glass with reference to a field of view of the occupant.

In an apparatus, a first highlight image may be projected onto positions corresponding to the other vehicle 321 and the front traffic light 322 included in the first main driving information, and a second highlight image having a different form from the first highlight image may be projected onto positions corresponding to the other vehicles 323 and 324 and the pedestrian 325 included in the second main driving information, thereby providing more specific three-dimensional driving information to the user.

Figure 4:
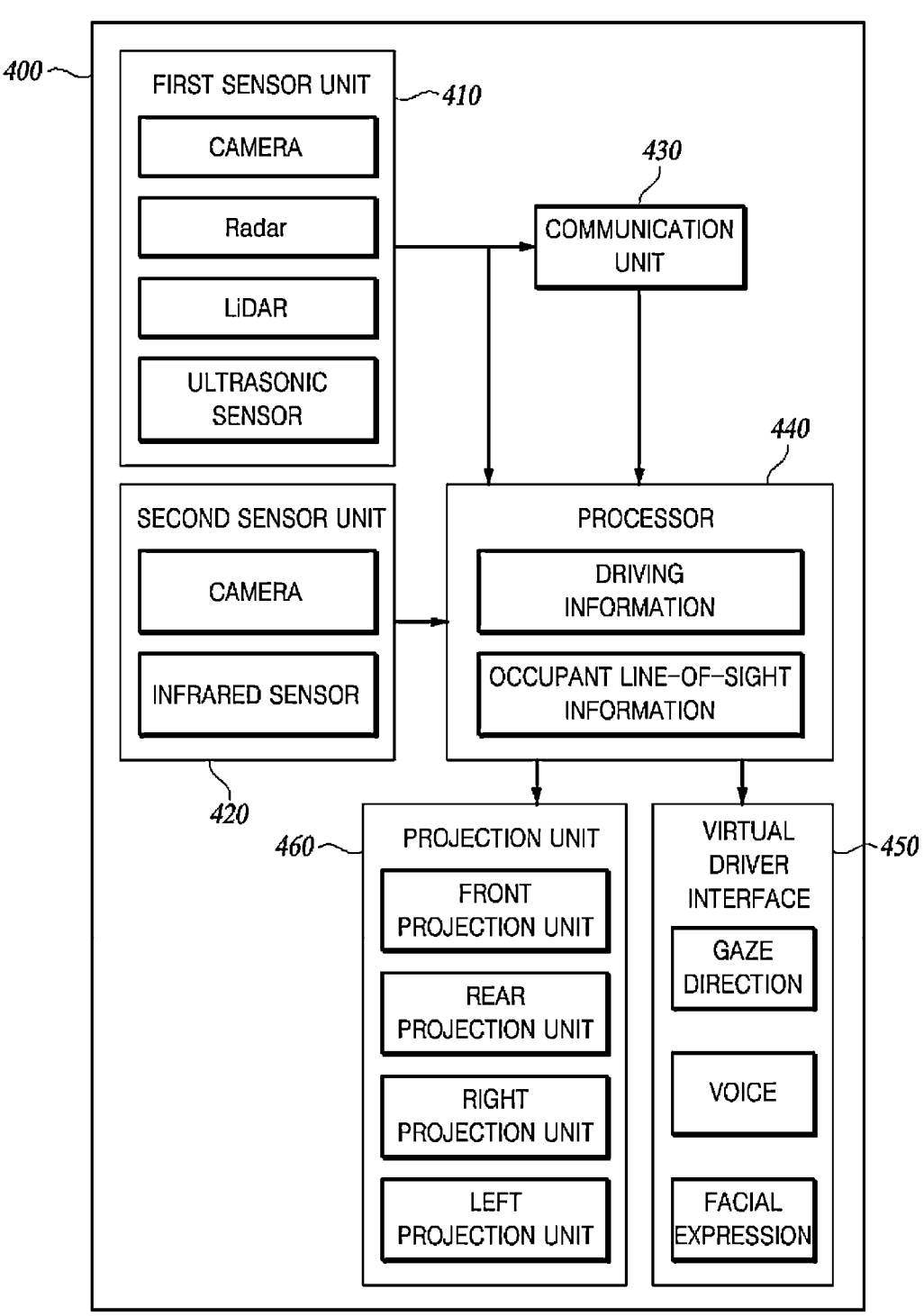
FIG. 4 is a block configuration diagram of an apparatus for providing driving information, according to another embodiment of the present disclosure.

FIG. 4 is a block diagram of an apparatus for providing driving information, according to another embodiment of the present disclosure.

Referring to FIG. 4, an apparatus for providing driving information 400 according an embodiment may include a first sensor unit 410, a second sensor unit 420, a communication unit 430, a processor 440, a virtual driver interface 450, and a projection unit 460.

The first sensor unit 410 may include a camera, a radar, a LiDAR, and an ultrasonic sensor installed at at least one preset position outside the autonomous vehicle. The first sensor unit 410 may be configured to acquire surroundings information including position information of various objects around the autonomous vehicle, speed information, and traffic situation information.

The second sensor unit 420 may include a camera and an infrared sensor that are installed at preset positions inside the autonomous vehicle to sense a pupil of the occupant in order to determine whether or not the occupant gazes at the monitoring target outside the autonomous vehicle corresponding to the main driving information based on the information on the occupant on board the autonomous vehicle, e.g., the information on the line-of-sight direction of the occupant.

The communication unit 430 may transmit the surroundings information acquired by the first sensor unit 410 to an external server (not illustrated) separately included for control of the autonomous vehicle and receive information on autonomous driving from the external server. The communication unit 430 may transmit the surroundings information transmitted by the first sensor unit 410 and the information on autonomous driving transmitted by the external server to the processor 440.

The communication unit 430 may include a controller area network (CAN) communication module for transmission and reception of data and control signals inside the autonomous vehicle, and may also include various wireless data communication network modules such as dedicated short range communications (DSRC), wireless access in vehicular environments (WAVE), WiFi, or 5G for communication with a server or an Intelligent Transport System (ITS) outside the autonomous vehicle.

The processor 440 may be configured to generate driving information based on the surroundings information transmitted by the first sensor unit 410 and the information on autonomous driving transmitted by the external server, and determine the main driving information to be provided to the occupant. The processor 440 may extract and track an important monitoring target that should be considered for safe driving of the autonomous vehicle from surroundings information on the surroundings situation of the autonomous vehicle. When there is a request from the occupant for the main driving information, for example, when the processor 440 determines that the occupant is gazing at the direction of the main driving information based on the line-of-sight direction information of the occupant acquired by the second sensor unit, the processor 440 may determine information on the monitoring target to be the information provided to the occupant.

The processor 440 may use occupant line-of-sight information generated based on information on the pupil position of the occupant transmitted by the second sensor unit 420 to determine whether there is a request for the main driving information from the occupant and to determine the information provided to the occupant.

The virtual driver interface 450 may be configured to interact with the occupant, provide information to the user, and receive information on request matters from the occupant.

The virtual driver interface 450 may be implemented as a three-dimensional holographic image including a face shape obtained by visually implementing the virtual driver. The virtual driver interface 450 may be displayed to change a gaze direction to indicate a monitoring direction of the autonomous vehicle according to the driving situation.

The virtual driver interface 450 may output various facial expressions and voices according to situations to enable interaction with the occupant. For example, the three-dimensional holographic face image of the virtual driver interface 450 may provide an interface between the autonomous vehicle and the occupant by receiving request matters from the occupant while monitoring the occupant and/or by displaying a situation-specific facial expression for smooth interaction.

The projection unit 460 may include a front projection unit for projecting an image of the information to be provided to the occupant onto the inner surface of the front windshield glass, a rear projection unit for projecting the image of the information to be provided to the occupant onto the inner surface of the rear windshield glass, a right projection unit for projecting the image of the information to be provided to the occupant onto an inner surface of a right windshield glass, and a left projection unit for projecting the image of the information to be provided to the occupant onto an inner surface of a left windshield glass The projection unit 460 may project a preset highlight image onto a position on the inner surface of the windshield glass determined in consideration of the position of the at least one object included in the information on the line-of-sight direction of the occupant and the main driving information so that the occupant can easily check the information to be provided to the occupant.

FIG. 5 is a flowchart illustrating a method of providing driving information, according to an embodiment of the present disclosure.

Referring to FIG. 5, the apparatus for providing driving information may acquire surroundings information of the autonomous vehicle (S510).

The apparatus for providing driving information may sense the surroundings of the autonomous vehicle by using a sensor installed at at least one preset position on the autonomous vehicle, and acquire surroundings information used for driving of the autonomous vehicle. The apparatus for providing driving information may acquire the surroundings information based on at least one of an image obtained in real time by a camera module installed outside the autonomous vehicle photographing the surroundings of the autonomous vehicle, or distance and speed information of on an object around the autonomous vehicle sensed by a radar or LiDAR.

The apparatus for providing driving information may acquire the information on the occupant of the autonomous vehicle (S520).

The apparatus for providing driving information may sense the occupant on board the autonomous vehicle and acquire information on the occupant. The apparatus for providing driving information may use at least one of a camera unit, an infrared sensor, or a microphone installed at a preset position inside the vehicle to sense the occupant.

The apparatus for providing driving information may acquire the information on the occupant of the autonomous vehicle. In an apparatus, the information on the occupant of the autonomous vehicle may include at least one of the information on the line-of-sight direction in which the occupant gazes, the information on the behavior of the occupant, or the voice information on the utterance of the occupant.

Specifically, the apparatus for providing driving information may acquire information on a situation of the occupant in order to determine whether the occupant requests the driving information of the autonomous vehicle. In an embodiment, the apparatus for providing driving information may acquire the information on the line-of-sight direction in which the occupant gazes, based on the pupil position of the occupant of the autonomous vehicle. When the line-of-sight direction of the occupant is directed to a position of the monitoring target of the autonomous vehicle present outside the autonomous vehicle or a direction of surroundings thereof, the apparatus for providing driving information may determine that the occupant requests the information on the driving situation outside the autonomous vehicle.

According to another embodiment of the present disclosure, when the apparatus for providing driving information senses a voice signal regarding a command requesting the driving information of the autonomous vehicle among voice signals for utterance of the occupant in addition to the line-of-sight direction of the occupant, the apparatus for providing driving information may determine that the occupant requests information on the driving situation outside the autonomous vehicle. However, the present disclosure is not limited thereto, and, in other embodiments, the apparatus for providing driving information may determine that the occupant requests information on the driving situation outside the autonomous vehicle in other suitable manners. In an embodiment, even when a preset behavior of the occupant is sensed, the apparatus for providing driving information may determine that the occupant requests the information on the driving situation outside the autonomous vehicle.

The apparatus for providing driving information may generate the main driving information from the surroundings information of the autonomous vehicle (S530).

The main driving information may be information selected in advance as the monitoring target of the autonomous vehicle according to the closeness to the driving situation among the information on the surroundings situation of the autonomous vehicle. The apparatus for providing driving information may determine, as the main driving information, information on other vehicles or pedestrians around the autonomous vehicle, obstacles present on a driving route of the autonomous vehicle, traffic lights present in front of the autonomous vehicle, road surface signs and road traffic signs present on a route of the autonomous vehicle in front of the autonomous vehicle, and the like that should be considered for driving control of the autonomous vehicle.

The main driving information may include first main driving information and second main driving information classified according to a preset priority. In an embodiment, the preset priority may be determined according to a difference in a degree of influence on safety from among the information that should be considered at the time of driving control of the autonomous vehicle. In another embodiment, the apparatus for providing driving information may set a surrounding object to be tracked for collision prevention in various driving situations of the autonomous vehicle as the first monitoring target, set information on such objects as the first main driving information, set other surrounding objects that should be considered preparatorily and incidentally as the second monitoring target, and determine information on such objects as the second main driving information. In an embodiment, the first main driving information and the second main driving information may include information on different objects according to the driving scenario of the autonomous vehicle.

The apparatus for providing driving information may generate the main driving information based on surroundings information. For example, the apparatus for providing driving information may detect, on an image obtained by photographing the surroundings of the autonomous vehicle, an object corresponding to at least one monitoring target set in advance according to the driving state and generate the main driving information including position information of the object.

The apparatus for providing driving information may determine the main driving information to be provided to the occupant based on the information on the occupant (S540). The apparatus for providing driving information may determine a region of interest of the occupant based on the information on the occupant, and determine the main driving information corresponding to the region of interest of the occupant from among the generated main driving information as the information to be provided to the occupant. In an embodiment, the region of interest of the occupant may be a region corresponding to a specific direction to which a driving situation that the occupant wonders or wants to check belongs.

The main driving information to be provided to the occupant may be determined based on information on the line-of-sight direction of the occupant included in the information on the occupant, but the present disclosure is not limited thereto. According to another embodiment, the main driving information to be provided to the occupant may be determined based on a preset behavior of the occupant included in the information on the occupant or a separate request command input by the occupant through interaction with the apparatus for providing driving information.

The apparatus for providing driving information may interact with the occupant of the autonomous vehicle, provide information to the user, and receive information on request matters from the occupant.

The apparatus for providing driving information may provide the occupant with a user interface including an image implemented as the virtual driver of the autonomous vehicle including the face shape. In an embodiment, the virtual driver may be a two-dimensional image or a three-dimensional holographic image including a face shape obtained by visually implementing the virtual driver of the autonomous vehicle. An image of the virtual driver may be displayed with a changed line-of-sight direction or various facial expressions according to the driving situation.

In some embodiments, the apparatus for providing driving information may be implemented to provide various types of information or perform a control operation through interaction with the occupant. When an additional request from the occupant or a preset operation is sensed, for example, when the occupant wants to change an internal temperature of the autonomous vehicle, the virtual driver of the apparatus for providing driving information may be displayed to receive a command while monitoring the occupant again or may provide navigation information on a current moving route, real-time news information, and the like according to a request from the occupant.

The apparatus for providing driving information may provide the determined main driving information to the occupant of the autonomous vehicle (S550).

The apparatus for providing driving information may project at least one image regarding the main driving information determined based on the information on the occupant onto the windshield glass inside the autonomous vehicle to provide the main driving information to the occupant. In an embodiment, the at least one image is a preset highlight image corresponding to the monitoring target object included in the main driving information to be provided to the occupant.

In an embodiment, when the line-of-sight direction of the occupant included in the information on the occupant acquired by the apparatus for providing driving information corresponds to any one of the forward, backward, left, and right directions of the autonomous vehicle, the apparatus for providing driving information determines the main driving information regarding the direction from among the plurality of pieces of main driving information as the information to be provided to the occupant, and projects a preset image corresponding to the determined main driving information onto the inner surface of the windshield glass for the direction. In an embodiment, the main driving information to be provided to the occupant may include position information of a gaze point determined based on information on the line-of-sight direction of the occupant, and position information on at least one monitoring target object included in the main driving information. The occupant can immediately check an object that the autonomous vehicle that is driving monitors from the highlight image projected in the line-of-sight direction of the occupant.

Various embodiments of systems and techniques described herein may be realized with digital electronic circuits, integrated circuits, field programmable gate arrays (FPGAs), application specific integrated circuits (ASICs), computer hardware, firmware, software, and/or combinations thereof. The various embodiments may include implementation with one or more computer programs that are executable on a programmable system. The programmable system may include at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data may be stored. The computer-readable recording medium may be a non-volatile or non-transitory medium such as a read-only memory (ROM), a random access memory (RAM), a compact disc ROM (CD-ROM), magnetic tape, a floppy disk, a memory card, a hard disk, or an optical data storage device. In addition, the computer-readable recording medium may further include a transitory medium such as a data transmission medium. Furthermore, the computer-readable recording medium may be distributed over computer systems connected through a network, and computer-readable program code may be stored and executed in a distributive manner.

Although operations are illustrated in the flowcharts/ timing charts in this specification as being sequentially performed, this is merely an example description of the technical idea of one embodiment of the present disclosure. In other words, those having ordinary skill in the art to which the present disclosure pertains may appreciate that various modifications and changes can be made without departing from essential features of an embodiment of the present disclosure. For example, the sequence illustrated in the flowcharts/timing charts can be changed and one or more operations of the operations can be performed in parallel. Thus, flowcharts/timing charts are not limited to the temporal order.

Although some embodiments of the present disclosure have been described for illustrative purposes, those having ordinary skill in the art should appreciate that various modifications, additions, and substitutions are possible, without departing from the idea and scope of the present disclosure. Therefore, the embodiments of the present disclosure have been described for the sake of brevity and clarity. The scope of the technical idea of the present embodiments is not limited by the illustrations. Accordingly, one of ordinary skill would understand that the scope of the present disclosure is not to be limited by the above explicitly described embodiments but by the claims and equivalents thereof.

What is claimed is:

1. A method of providing driving information of an autonomous vehicle performed by an apparatus for providing driving information of the autonomous vehicle including a first sensor unit, a second sensor unit, a processor, and a projection unit, the method comprising:
   acquiring, by the first sensor unit, surroundings information of the autonomous vehicle;
   acquiring, by the second sensor unit, information on an occupant on board the autonomous vehicle;
   generating, by the processor, main driving information from the surroundings information of the autonomous vehicle acquired by the first sensor unit;
   determining, by the processor, the main driving information to be provided to the occupant from among the main driving information based on the information on the occupant;
   providing, by the projection unit, the main driving information determined by the processor to the occupant of the autonomous vehicle;
   generating, by the processor, a facial image of a virtual driver that has a facial expression and a gaze direction corresponding to the information on the occupant and the determined main driving information; and
   controlling, by the processor, a virtual driver user interface to display the generated facial image of the virtual driver,
   wherein the virtual driver is controlled to selectively gaze at an external region of the autonomous vehicle based on the information on the occupant and the determined main driving information.

2. The method of claim 1, wherein the information on the occupant includes at least one of information on a line-of-sight direction in which the occupant gazes, information on a behavior of the occupant, or voice information on utterance of the occupant.

3. The method of claim 2, further comprising:
   detecting, from the utterance of the occupant or the behavior of the occupant, a command indicating an intention to check real-time driving information regarding external objects recognized and tracked by the autonomous vehicle.

4. The method of claim 3, further comprising:
   determining, among the external objects recognized and tracked by the autonomous vehicle for autonomous driving, a monitoring target corresponding to a current driving state of the autonomous vehicle and a request detected from the utterance of the occupant or the behavior of the occupant; and projecting, onto a windshield glass of the autonomous vehicle, a highlight image surrounding the monitoring target.

5. The method of claim 1, wherein generating the main driving information from the surroundings information of the autonomous vehicle acquired by the first sensor unit includes:

determining a driving state of the autonomous vehicle, setting at least one monitoring target set in advance according to the driving state, and detecting the monitoring target from the surroundings information of the autonomous vehicle acquired by the first sensor unit.

6. The method of claim 5, wherein the at least one monitoring target set in advance comprises at least one of another vehicle present around the autonomous vehicle, a pedestrian present around the autonomous vehicle, an obstacle on a driving route of the autonomous vehicle, a traffic light present in front of the autonomous vehicle, a road surface sign present in front of the autonomous vehicle, or a road traffic sign present in front of the autonomous vehicle.

7. The method of claim 1, wherein determining the main driving information to be provided to the occupant from among the main driving information based on the information on the occupant includes:

determining a region of interest of the occupant based on the information on the occupant, and determining main driving information corresponding to the region of interest of the occupant from among the main driving information.

8. The method of claim 1, wherein providing the main driving information determined by the processor to the occupant of the autonomous vehicle includes:

determining a point to project the main driving information onto from among a plurality of preset points inside the autonomous vehicle based on the information on the occupant, wherein the point onto which the main driving information is projected comprises a point on an inner surface of at least one windshield glass of the autonomous vehicle, and projecting, by the projection unit located inside the autonomous vehicle, an image regarding the main driving information onto the point.

9. The method of claim 1, further comprising:

determining a driving scenario of the autonomous vehicle; and selecting, from among external objects recognized and tracked by the autonomous vehicle for autonomous driving, a monitoring target based on the determined driving scenario, wherein i) the driving scenario is determined as one of a plurality of driving scenarios and ii) different monitoring targets are selected based on each driving scenario among the plurality of driving scenarios of the autonomous vehicle, wherein the plurality of driving scenarios includes a scenario in which the autonomous vehicle merges into a main road, or a scenario in which the autonomous vehicle passes through an intersection.

10. An apparatus for providing driving information of an autonomous vehicle, the apparatus comprising:

a first sensor unit configured to acquire surroundings information of the autonomous vehicle;

a second sensor unit configured to acquire information on an occupant on board the autonomous vehicle;

a processor configured to:

generate main driving information from the surroundings information of the autonomous vehicle acquired by the first sensor unit, determine main driving information to be provided to the occupant from among the main driving information based on the information on the occupant acquired by the second sensor unit, generate a facial image of a virtual driver that has a facial expression and a gaze direction corresponding to the information on the occupant and the determined main driving information, and control a virtual driver user interface to display the generated facial image of the virtual driver; and a projection unit configured to provide the main driving information determined by the processor to the occupant, wherein the virtual driver is controlled to selectively gaze at an external region of the autonomous vehicle based on the information on the occupant and the determined main driving information.

11. The apparatus of claim 10, wherein the information on the occupant includes at least one of information on a line-of-sight direction in which the occupant gazes, information on a behavior of the occupant, or voice information on utterance of the occupant.

12. The apparatus of claim 11, wherein the processor is configured to:

detect, based on the utterance of the occupant or the behavior of the occupant, a command indicating an intention to check real-time driving information regarding external objects recognized and tracked by the autonomous vehicle.

13. The apparatus of claim 12, wherein the processor is configured to:

determine, among the external objects recognized and tracked by the autonomous vehicle for autonomous driving, a monitoring target corresponding to a request detected from the utterance of the occupant or the behavior of the occupant, and control the projection unit to project a highlight image surrounding the monitoring target onto a windshield glass of the autonomous vehicle.

14. The apparatus of claim 10, wherein the processor is configured to:

determine a driving state of the autonomous vehicle, set at least one monitoring target set in advance according to the driving state, and detect the monitoring target from the surroundings information of the autonomous vehicle acquired by the first sensor unit.

15. The apparatus of claim 14, wherein the at least one monitoring target set in advance comprises at least one of another vehicle present around the autonomous vehicle, a pedestrian present around the autonomous vehicle, an obstacle on a driving route of the autonomous vehicle, a traffic light present in front of the autonomous vehicle, a road surface sign present in front of the autonomous vehicle, or a road traffic sign present in front of the autonomous vehicle.

16. The apparatus of claim 10, wherein the processor is configured to:

determine a region of interest of the occupant based on the information on the occupant, and determine main driving information corresponding to the region of interest of the occupant from among the main driving information.

17. The apparatus of claim 10, wherein the projection unit is configured to:

determine a point to project the main driving information onto from among a plurality of preset points inside the autonomous vehicle based on the information on the occupant, wherein the point onto which the main driving information is projected comprises a point on an inner surface of at least one windshield glass of the autonomous vehicle, and project an image regarding the main driving information onto the point.

18. The apparatus of claim 10, wherein the processor is configured to:

determine a current driving scenario of the autonomous vehicle; and select, from among external objects recognized and tracked by the autonomous vehicle for autonomous driving, a monitoring target based on the determined driving scenario, wherein i) the driving scenario is determined as one of a plurality of driving scenarios and ii) different monitoring targets are selected based on each driving scenario among the plurality of driving scenarios, wherein the driving scenario includes a scenario in which the autonomous vehicle merges into a main road, or a scenario in which the autonomous vehicle passes through an intersection.

19. The apparatus of claim 10, wherein:

the main driving information includes an external object recognized and tracked by the autonomous vehicle for autonomous driving; and the virtual driver is controlled to gaze the external object.

20. The apparatus of claim 10, wherein:

the main driving information includes a first main driving information which is prioritized over other types of driving information for autonomous driving control of the autonomous vehicle, and a second main driving information which is considered preparatorily or incidentally in relation to the first main driving information; and the processor is configured to control the projection unit to project highlight images at respective positions corresponding to the first main driving information and the second main driving information, wherein highlight images having different shapes are projected respectively for the first main driving information and the second main driving information.

* * * * *